United States Patent [19]

Flajnik

[11] 4,164,283
[45] Aug. 14, 1979

[54] FRICTION-REDUCING HIGH SPEED CHAIN GUIDES

[75] Inventor: Louis Flajnik, Berwyn, Ill.

[73] Assignee: The Continental Group, Inc., New York, N.Y.

[21] Appl. No.: 919,189

[22] Filed: Jun. 26, 1978

[51] Int. Cl.² ............... B65G 15/62; B65G 17/06; B65G 21/20
[52] U.S. Cl. .................................. 198/840; 198/831; 198/841; 198/850
[58] Field of Search ............... 198/831, 837, 839, 840, 198/841, 842, 850, 851, 852

[56] References Cited

U.S. PATENT DOCUMENTS

| | | | |
|---|---|---|---|
| 2,114,146 | 4/1938 | Klein et al. | 198/831 |
| 3,094,206 | 6/1963 | Stewart et al. | 198/840 X |
| 3,237,754 | 3/1966 | Freitag et al. | 198/831 |

FOREIGN PATENT DOCUMENTS 855070 11/1960 United Kingdom ............... 198/837

*Primary Examiner*—James L. Rowland
*Attorney, Agent, or Firm*—Charles E. Brown

[57] ABSTRACT

A guide assembly for defining a curved path for a link type conveyor. The guide assembly includes individual curved guides having flanges defining support and guide rails for link elements of the conveyor. The guide rails are mounted in pairs and include an inner guide rail and an outer guide rail. At least the inner guide rail is provided with closely adjacent rollers against which the conveyor links ride and which rollers primarily define the path of movement of the conveyor around the curve. Each roller is carried by one rail of its respective guide and is mounted on a removable shaft in the form of a threaded fastener. The other rail of the guide is provided with an access opening, which access opening also provides for the ventilation of the roller so as to cool the roller.

10 Claims, 3 Drawing Figures

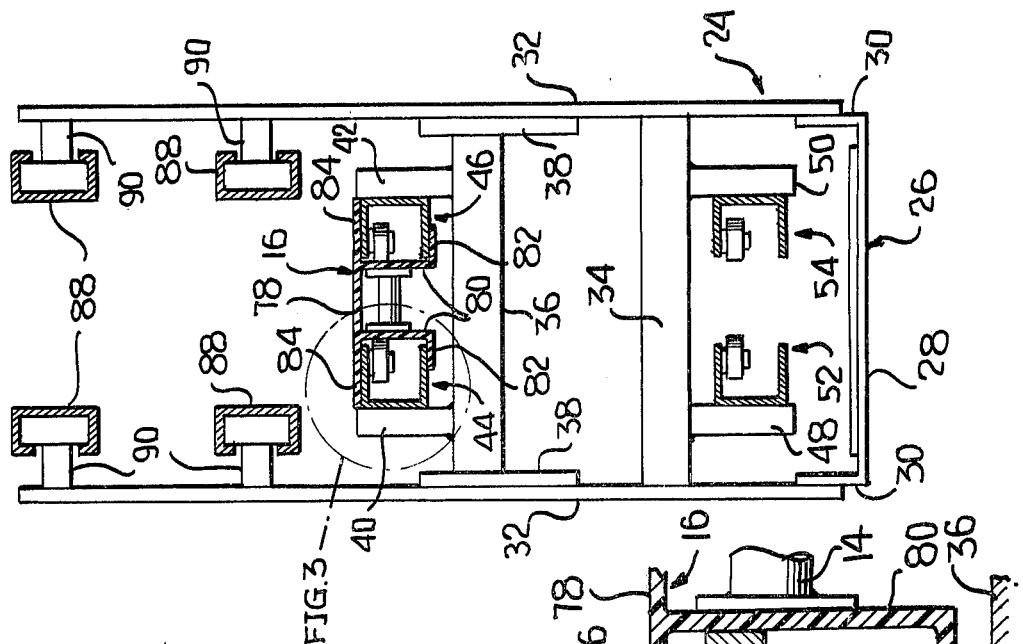

FRICTION-REDUCING HIGH SPEED CHAIN GUIDES

This invention relates in general to new and useful improvements in conveyor assemblies, and more specifically to a guide assembly for guiding a link type conveyor around a curved portion of its travel.

In the prior devices, no simple satisfactory arrangement has been heretofore provided for guiding a conveyor around a turn at a high speed. This is particularly true in conjunction with conveyors for moving containers such as cans.

Various complex devices have been used, including the addition of such supplementary devices as lubricants and large horsepower motors, to reduce friction. One problem is that as the conveyor speed increases, the friction also increases, requiring additional energy in the system to perform the function. Conveyors for containers are constantly increasing in speed, and at the present conveyors are moved at a rate approximating 2,000 containers per minute. This increase in friction, and thus in the additional energy required, clearly indicates the need for a friction reducing guide assembly.

This invention particularly relates to the mounting of a table-top chain conveyor particularly adapted for the conveying of containers, such as cans. Such conveyors not only include flexible chain links, but carried by the links are support elements which are engaged with the guide assembly and which, in combination with one another, define a substantially continuous supporting surface which may be considered to be a table.

This invention particularly contemplates providing horizontal runs of a link type conveyor with guide assemblies so as to facilitate the movement of the conveyor along a curved path with a minimum of resistance, friction, and resultant heat. This would reduce the amount of costly wear and tear and resultant down time. The result would be an increase in productivity, especially in the food and beverage industries.

Most particularly, this invention relates to a guide assembly which includes a pair of guides which together define a curved path for a conveyor. The guides also include rails which are engaged by the support defining links so as generally to determine the curved path of the conveyor. Further, at least an inner guide of the guide assembly is provided with adjacent rollers which engage the inner surfaces of the supporting links and thereby provide for a greatly reduced antifriction guiding of the conveyor links.

In a preferred embodiment of the guide, the guide is a structural shape, preferably channel, and includes upper and lower rails with one of the rails carrying the rollers. Each roller is carried by a stub shaft defined by a shoulder fastener which is threaded into the respective rail so as to be removable. The other rail of the guide is provided with an aperture aligned with each threaded fastener to facilitate the replacement of a roller and the openings serve the dual purpose of functioning as vents so that air may be circulated within the guide and effect cooling of the rollers.

With the above and other objects in view that will hereinafter appear, the nature of the invention will be more clearly understood by reference to the following detailed description, the appended claims, and the several views illustrated in the accompanying drawings.

In the drawings:

FIG. 1 is a plan view of a conveyor assembly formed in accordance with this invention.

FIG. 2 is an enlarged fragmentary transverse vertical sectional view taken along the line 2—2 of FIG. 1, and shows specifically the details of the guide assembly of the conveyor.

FIG. 3 is an enlarged fragmentary sectional view taken in the area designated as FIG. 3 in FIG. 2, and shows most specifically the details of a guide rail and the mounting of a supporting link of the conveyor thereon.

Referring now to the drawings in detail, it will be seen that there is illustrated in FIG. 1 a conveyor assembly in accordance with this invention, the conveyor assembly being generally identified by the numeral 10. The conveyor assembly 10 includes a conventional link type conveyor which is generally identified by the numeral 12. The conveyor 12 is composed of an endless chain 14 having links interconnected so that they may not only pass around drive and idler sprockets in the normal manner, but are also so interconnected that the chain is flexible in a transverse direction so that a horizontal run of the chain, for example, may pass around a horizontal curve. At least certain of the links of the conveyor chain 14 carry support forming links or elements 16 which will be described in more detail hereinafter. The links 16, as shown in FIG. 1, are disposed closely adjacent one another so as to form a substantially continuous table for supporting containers or the like while at the same time are configurated for freedom of relative turning movement so that they may traverse a horizontal curve in addition to a vertical curve about a sprocket.

The conveyor 12 has straight runs 18, 20 joined by a curved run 22. The manner in which the conveyor is supported and guided along the straight runs 18, 20 is not a part of this invention and no attempt will be made to describe the same here. On the other hand, the conveyor 12 is supported for guided movement along its curved run 22 by a guide assembly 24 which is the subject of this invention.

The guide assembly 24 may include any satisfactory support frame arrangement. However, in the illustrated embodiment the support frame includes a lower support member 26 in the form of an upwardly opening channel having a horizontal web 28 and upstanding flanges 30. Carried by the flanges 30 at spaced intervals are uprights 32. These uprights are joined together at spaced intervals by a pair of horizontal support bars 34, 36. The horizontal support bar 36 is removably secured to the uprights 32 by means of mounting plates 38 so that access to the lower part of the guide assembly 24 may be available.

Each support bar 36 carries a pair of upstanding supports 40, 42. The supports 40, which are disposed innermost, carry an inner guide member which is generally identified by the numeral 44. A similar outer guide member, generally identified by the numeral 46, is carried by the outer support 42. The guide members 44, 46 are concentrically arranged and generally define a curved path for the conveyor 12.

Each support 34 has depending therefrom a pair of supports 48, 50. The supports 48 are disposed innermost and carry an inner guide member 52 while the supports 50 are disposed outermost and carry an outer guide member 54. The guide members 44 and 52 may be identical, and the guide members 46 and 54 may be identical. It is further to be understood that the guide members 44, 46, 52 and 54 will be removably secured to their respective supports by suitable fasteners such as the bolts 56 illustrated in FIG. 3.

The guide member 44 is typical of the guide members and thus will be specifically described here. The guide member 44 is in the form of a structural shape which is preferably a channel and includes a web 58 and a pair of rail forming flanges 60, 62. The guide member 44 is preferably formed of a non-magnetic metal, such as #304 stainless steel.

A plurality of antifriction rollers 66 are disposed below the flange 60 and project radially outwardly thereof, as is clearly shown. The rollers 66 are conventional and each is mounted on a stub shaft 68 which is defined by the shank of a shoulder bolt 70. The shoulder bolt 70 has a short threaded end portion 72 which is threaded in an internally threaded bore 74 in the flange 60. The head of the bolt 70 may be of any type, although the illustrated bolt is of the Allen head type. The roller 66 is preferably spaced from the underside of the flange 60 by a spacer or washer 76.

At this time the construction of a support forming link 16 is described with reference to FIG. 2. Each link 16 includes an outermost support element 78 which has depending from the central portion thereof two spaced webs 80. The ends of the webs 80 remote from the support element 78 carry oppositely directly flanges 82 which are parallel to the support element 78. It is to be noted that the support element 78 is of a length so as to extend beyond the webs 80 sufficiently to define a supporting portion 84 at each side thereof for engagement with a respective guide member.

Referring now most specifically to FIG. 3, it will be seen that when the supporting element 16 is engaged with the guide member 44, the portion 84 thereof overlies and rides on the rail defined by the flange 60 with the flange 60 forming the primary load bearing support for the one side of the support link 16. The flange 82 underlies the flange 62 and vertically stabilizes the mounting of the support link 16.

The webs 82 are secured to the links of the chain 14 in a conventional manner with at least the innermost web 80 engaging the rollers 66.

From the foregoing, it will be seen that the friction normally resulting from the drag of the conveyor 12 around an inner guide is greatly reduced in that the radial supporting and guiding is accomplished entirely by the rollers 66. This is the primary source of friction in the conveyor assembly 10. While there is some friction between the supporting elements 78 and the flange 60, this is minimal and is acceptable at the present speeds.

At this time it is pointed out that although the outer guide members 46 and 54 have also been illustrated as having guide rollers, it is to be understood that such guide rollers are not absolutely necessary in that all radial forces on the conveyor 12 are inwardly directed forces and all guiding in a radial direction is effected by the roller 66 of the inner guide members.

It is also pointed out here that substantially all of the wear is in the upper guide members 44, 46 with there being minimal wear in the lower guide members 52, 54. Therefore, at least the inner guide members 44 and 52 should be identical and thus interchangeable.

Referring once again to FIG. 3, it is to be noted that the flange 62 is provided with an aperture 86 therein in alignment with each of the fasteners 70. This aperture facilitates the installation and removal of the roller 60. It has been found that the cooperation of the flanges 82 with the flange 62 and the apertures 86 therein provide for a pumping action and a circulation of air within the guide member 44. This circulating air serves to ventilate and cool the roller 66.

Any suitable upper guides may be provided for the articles to be conveyed by the conveyor 12. In the illustrated guide assembly 24, there are upper and lower sets of guide rails 88 which are arcuate in accordance with the curved path of the conveyor. The guide rails 88 are carried by suitable supports 90 which project in opposed relation from the uprights 32.

Although only a preferred embodiment of the invention has been specifically illustrated and described herein, it is to be understood that minor modifications may be made in the guide assembly and its relationship to the conveyor without departing from the spirit and scope of the invention as defined by the appended claims.

I claim:

1. A guide for guiding a link conveyor around a curved path, said guide having a curvature in accordance with the desired curved path, said guide being in the form of a structural section and including a conveyor supporting rail presenting a wide and flat substantially horizontal supporting surface, for directly supporting said link conveyor and a plurality of roller elements carried by said rail in partially vertically overlapping relation and projecting radially beyond said rail for engagement with a link conveyor to determine the curved path of said conveyor.

2. The guide of claim 1 wherein each roller element is rotatably journalled on a pin-like shaft carried at least in part by said rail and extending substantially normal to said supporting surface of said rail.

3. The guide of claim 1 wherein each roller element is rotatably journalled on a pin-like shaft carried solely by said rail and extending substantially normal to said supporting surface of said rail.

4. The guide of claim 1 wherein there are two of said rails disposed in parallel relation, each of said roller elements being journalled on a pin-like shaft carried by one only of said rails, and the other of said rails having an access opening in alignment with each shaft, said access opening further defining a ventilation passage.

5. The guide of claim 4 wherein said structural section is a channel.

6. A conveyor assembly comprising a link conveyor having at least one run including two straight portions joined to a curved portion, and a guide assembly for guiding said conveyor around a curved path to define said curved run portion, said guide assembly including inner and outer guides defining said curved path, said conveyor having support forming links engaging said inner and outer guides, each guide having at least an upper rail having an upper supporting surface and said links having portions riding on said rail upper supporting surfaces in primary supported relation, said links having a web opposing at least said inner guide, and a plurality of roller elements carried by said inner guide rail and engaging facing ones of said link webs to determine the curved path of said conveyor.

7. The conveyor assembly of claim 6 wherein each roller element is rotatably journalled on a pin-like shaft carried at least in part by said rail with the respective roller element projecting radially outwardly beyond said inner guide rail.

8. A conveyor assembly comprising a link conveyor having at least one run including two straight portions joined by a curved portion, and a guide assembly for guiding said conveyor around a curved path to define said curved run portion, said guide assembly including inner and outer guides defining said curved path, said conveyor having support forming links engaging said inner and outer guides, each guide having at least an upper rail and said links having portions riding on said rails, said links having a web opposing at least said inner guide, and a plurality of roller elements carried by said inner guide rail and engaging facing ones of said link webs to determine the curved path of said conveyor, at least said inner guide having two of said rails disposed in parallel relation, each of said roller elements being journalled on a pin-like shaft carried by one only of said rails, and the other of said rails having an access opening in alignment with each shaft, said access opening further defining a ventilation passage.

9. The conveyor assembly of claim 8 wherein at least said inner guide is of a channel cross sectional shape.

10. The conveyor assembly of claim 8 wherein each of said guides is of a channel cross sectional shape.

* * * * *